United States Patent [19]

Okada et al.

[11] 4,308,192

[45] Dec. 29, 1981

[54] METHOD AND APPARATUS FOR FORMING DOUBLE-LAYER HOLLOW FILM

[75] Inventors: Masao Okada; Masayoshi Ono, both of Gifu, Japan

[73] Assignee: Ube-Nitto Kasei Co., Ltd., Tokyo, Japan

[21] Appl. No.: 169,196

[22] Filed: Jul. 15, 1980

[30] Foreign Application Priority Data

Jan. 29, 1980 [JP] Japan .................................. 55-8370

[51] Int. Cl.³ .............................................. B29D 7/20
[52] U.S. Cl. ................................... 264/40.3; 264/40.6; 264/514; 264/557; 264/559; 264/560; 264/565; 264/566; 264/569; 264/178 R; 264/180; 425/71; 425/72 R; 425/326.1
[58] Field of Search ............... 264/557, 558, 559, 560, 264/561, 562, 565, 566, 569, 173, 178 R, 180, 512, 514, 515, 40.6, 40.3; 425/71, 326.1, 72 R, 380

[56] References Cited

U.S. PATENT DOCUMENTS

| | | | |
|---|---|---|---|
| 3,193,547 | 7/1965 | Schott, Jr. | 264/562 |
| 3,655,846 | 4/1972 | Kanoh et al. | 264/562 |
| 3,812,230 | 5/1974 | Takahashi | 264/177 R |
| 3,825,641 | 7/1974 | Barnett | 264/177 R |
| 4,003,973 | 1/1977 | Kurokawa et al. | 264/178 R |

*Primary Examiner*—Jeffery R. Thurlow
*Attorney, Agent, or Firm*—Wenderoth, Lind & Ponack

[57] ABSTRACT

A molten thermoplastic resin is extruded in the form of a double-layer cylindrical hollow film with the two film layers being interconnected with each other by a number of spaced legs and is then immediately passed through an annular gap defined by annular side walls of inner and outer vessels in such a manner that the two film layers are in contact with the respective side walls defining the gap. Coolant is supplied to the inner and outer vessels and overflows above the side walls to bring the coolant into contact with the resin. The level of the coolant overflowing above both side walls is adjusted to be equal and also to have a liquid pressure on the extruded resin balanced with a gas pressure supplied in between the two film layers and the legs of the extruded resin.

8 Claims, 4 Drawing Figures

METHOD AND APPARATUS FOR FORMING DOUBLE-LAYER HOLLOW FILM

BACKGROUND OF THE INVENTION

This invention relates to method and apparatus for forming a double-layer hollow film, in which a pair of film layers are interconnected integrally by a number of spaced legs so as to define a number of elongated compartments between the pair of film layers.

A hollow film of this type in the excellent heat insulative property, i.e. heat-storing property, compared with a conventional mono-layer sheet film, and therefore has recently drawn much attention as a covering material for greenhouses. However, if such a hollow film has extremely lower light permeability than the conventional mono-layer sheet film because of its double-layer hollow construction, solar heat in the daytime cannot be stored sufficiently within the greenhouse. Further, if a number of legs bridging between the pair of film layers cannot separate these films sufficiently to define elongated compartments therebetween, the heat insulation effect is decreased too low to be used as covering material a greenhouse. In addition, it is required that such a hollow film can be wound up for storage transportation as in the case of the conventional mono-layer sheet film. It is also necessary for the hollow film to have sufficient flexibility to increase working efficiency.

In the conventional technique, however, it has been impossible to economically form such double-layer hollow film having a pair of film layers integrally molded with a plurality of legs from a transparent, thin and flexible for obtaining a desired level of light permeability with the legs being thin but firm to prevent the compartments defined thereby between the pair of film layers from being deformed or crushed.

In one method for forming a double-layer hollow film, an inflation-extrusion process has been proposed as disclosed in Japanese Patent Publication No. 133263/1975. According to this inflation-extrusion process, a molten thermoplastic resin is extruded and inflated outwardly of an annular extruding die including a pair of annular slits, having different diameters and arranged concentrically, and a plurality of slits interconnecting between these annular slits. Upon inflating the thus extruded resin, in order to prevent the legs interconnecting the film layers from being deformed irregularly or bent, it becomes necessary to regulate the pressure of gas supplied to the center space of the annularly inflated film and also the pressure of gas supplied inbetween the smaller and larger diameter slits. However, such regulation is extremely difficult to carry out by present day techniques. Further, in the known process, the inflated resin is subjected to air-cooling for curing. However, air-cooling takes a considerate amount of time, during which the resin is generally likely to be stretched or extended to be so thin that the legs between the film layers are distorted or bent. The light permeability of the resin is also decreased during a slow cooling operation, resulting in low utility.

Water-cooling can be employed instead of air-cooling. The conventional water-cooling process, however, which has been used for cooling mono-layer film, cannot provide a simultaneous and uniform cooling to the two film layers without deforming the compartments defined therebetween. Thus, water-cooling has the defects as in the case of the air-cooling.

It is therefore an object of the present invention to improve the above-mentioned known method and apparatus for forming a double-layer hollow film.

Another object of the present invention is to provide a method and apparatus for forming a double-layer hollow film having high light permeability and desired thickness as well as flexibility.

A further object of the present invention is to provide a method and apparatus as set forth above in which the double film layers are separated as desired by legs therebetween for enhancing heat insulation.

SUMMARY OF THE INVENTION

According to a method of the present invention, a molten thermoplastic resin is extruded in the form of a double-layer cylinder hollow film with the two film layers being interconnected with each other by a number of spaced legs, and then immediately is passed through an annular gap defined by annular side walls of inner and outer vessels in such a manner that the two film layers are in contact with the respective side walls defining the gap. Liquid coolant is supplied in the inner and outer vessels and overflows above the side walls to bring the coolant into contact with the resin. The level of the coolant which overflows above both side walls is adjusted to be equal with each other and also to have a liquid pressure on the extruded resin which is balanced with a gas pressure supplied in between the two film layers and the legs of the extruded resin.

According to another aspect of the present invention, there is provided an apparatus for forming a double-layer hollow film which comprises an extruding die, the outlet of which has a pair of inner and outer annular slits provided concentrically and closely adjacent to each other and a number of leg slits extending between the pair of annular slits. The extruding die also has means for feeding a pressurized air in between the pair of annular slits and the legs slits in the outlet. Provided below the extruding die are inner and outer vessels in which the inner vessel is located at the inner position of the pair of annular slits and the outer vessel is located around the inner vessel. The inner and outer vessels have an outer annular side wall and an inner annular side wall, respectively, which define an annular gap therebetween through which the resin extruded from the outlet of the extruding die in the double-layer cylindrical form passes in contact with the inner and outer annular side walls. The apparatus further comprises means for supplying liquid coolant to the inner and outer vessels and for overflowing the coolant therefrom and means for adjusting the level of the coolant which overflows above the upper end surfaces of the outer and inner side walls of the inner and outer vessels, respectively, to be equal with each other. The level of the overflowing coolant is adjusted to provide a liquid pressure on the extruded resin which is balanced with the air pressure supplied in between the pair of annular slits and the leg slits.

Other objects and features of the present invention will become apparent from the following detailed description of a preferred embodiment thereof when taken in conjunction with the accompanying drawings, in which:

DETAILED DESCRIPTION OF PREFERRED EMBODIMENTS OF THE INVENTION

Figure 1:
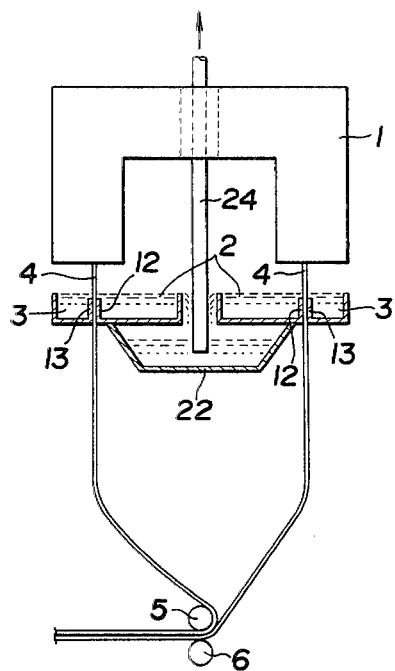
FIG. 1 is a partially sectioned schematic front view showing an appartus according to a preferred embodiment of the present invention.
Figure 4:
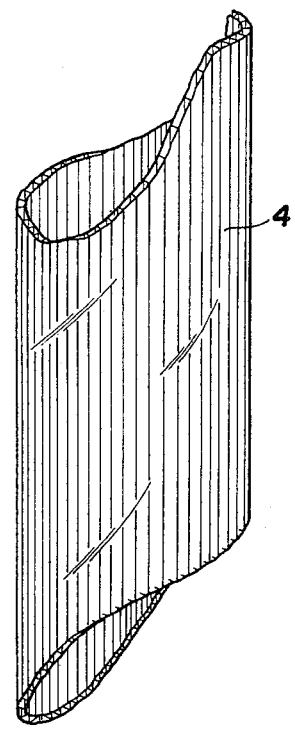
FIG. 4 is a perspective view partially showing a double-layer cylindrical hollow film formed by the process of the present method.

In FIG. 1, reference numeral 1 denotes a die for extruding a molten thermoplastic resin, immediately below which there are provided an inner annular coolant vessel 2 and an outer annular coolant vessel 3. The thermoplastic resin 4 extruded from the outlet of the extruding die in a double-layer cylindrical form is cooled and cured immediately by liquid coolant, i.e. water, in these two coolant vessels 2 and 3 and then folded by a pair of pinch rollers 5 and 6 from the cylindrical form into sheet form. The folded film is severed at one side and wound up in a proper fashion as a double-layer hollow sheet film.

Figure 2:
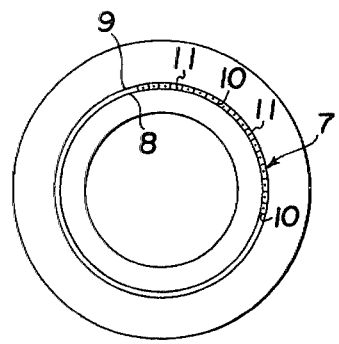
FIG. 2 is a partially sectioned plan view showing an outlet of an extruding die of the apparatus in FIG. 1.

The outlet 7 of the extruding die 1 comprises, as shown in FIG. 2 in detail, a pair of annular slits 8 and 9 provided concentrically and closely adjacent to each other and a number of leg or radial slits 10 extending between the annular slits 8 and 9. These annular slits 8 and 9 and two adjacent leg slits 10—10 define unit compartments, each including an air blast hole 11. With the extruding die 1 having the thus constructed outlet 7, the molten thermoplastic resin 4 extruded therefrom forms a double-layer cylinder having two layers interconnected by a number of legs. In this embodiment, since the air supplied from the air blast holes 11 do not have such a pressure as can inflate the resin forming the two layers, the molten thermoplastic resin is introduced into the coolant vessels 2 and 3 substantially in the form of the initial double-layer cylinder.

Figure 3:
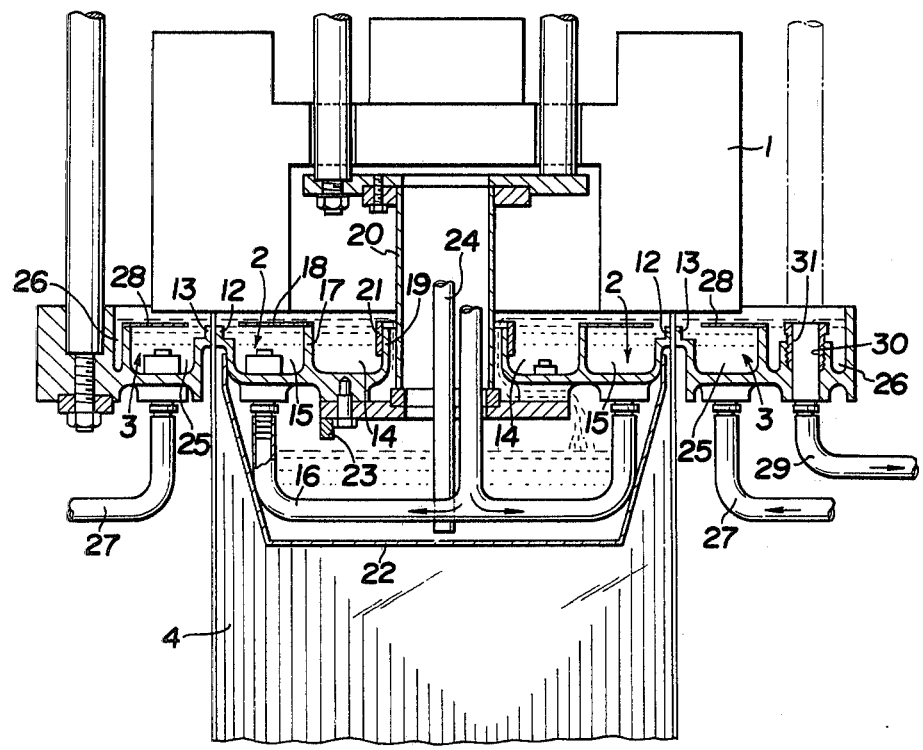
FIG. 3 is a partially sectioned front view showing a cooling device applied in the apparatus in FIG. 1.

The coolant vessels 2 and 3 are arranged just below the outlet 7 of the die as shown in detail in FIG. 3. In this embodiment the space between the outlet 7 and the water level in the coolant vessels should be as narrow as possible, preferably, about 10 mm to 20 mm so that the double-layer resin can be subjected to water-cooling immediately after being extruded from the die 1. The outer vertical wall 12 of the inner annular coolant vessel 2 is slightly spaced from the inner vertical wall 13 of the outer annular coolant vessel 3. The diameters of the outer and inner vertical walls 12 and 13 of the inner and outer vessels 2 and 3 are almost equal to those of the inner and outer annular slits 8 and 9 in the outlet of the extruding die 1, respectively. But, the gap formed between the vertical walls 12 and 13 is slightly narrower than that between the concentrically arranged annular slits 8 and 9. The double-layer film, subject to draft of the pinch rollers 5 and 6 so as to decrease the space between the film layers, is guided vertically between the outer and inner vertical walls 12 and 13 with the film layers in contact therewith.

The inner or discharge annular coolant vessel 2 has an inner annular recess 14 and an outer or supply annular recess 15 separated by a partition wall 17. A water supply pipe 16, through which cooling water is supplied into the recess 15 is connected to the bottom of the outer annular recess 15. At the upper end of the partition wall 17 a deflection plate 18 is provided for guiding the cooling water supplied into the recess 15 toward the upper portion of the outer side wall 12 of the recess 15.

The inner side wall 19 of the inner annular recess 14 defines a central opening of the coolant vessel 2, through which a large diameter pipe 20 supporting the coolant vessel 2 extends with a space from the inner side wall 19. The inner side wall 19 is also provided, e.g. by threaded engagement, with a water level regulator ring or weir 21. With such a construction, the cooling water supplied from the pipe 16 into the outer annular recess 15 overflows towards the upper portion of the outer vertical side wall 12 and bears against the inner film layer of the double-layer cylindrical film for cooling and curing the same, and then flows over the upper surface of the deflection plate 18 into the inner annular recess 14. The water, surpassing the upper end of the water level regulator ring 21, flows down through the gap between the inner side wall 19 and pipe 20 and is pooled temporarily in a water reservoir 22 provided below the inner coolant vessel 2. The level of the water pooled in the reservoir 22 is detected by a detector 23 and when the detector 23 detects a water level higher than a predetermined value, water is discharged to the exterior through an drain pipe 24 which extends through the large diameter pipe 20. As can be understood from the foregoing description, the regulation of the level of water which overflows above the outer vertical side wall 12 for cooling the extruded film can be carried out by the vertical displacement of the water level regulator ring 21. Such level is preferably 5 to 20 mm.

The outer annular coolant vessel 3 is also separated into an inner or supply annular recess 25 and an outer or discharge annular recess 26. A water supply pipe 27 through which cooling water is supplied to the recess 25, is connected to the bottom of the inner annular recess 25. At the upper end of a partition wall between the annular recesses 25 and 26 is fitted deflection plate 28 for guiding the cooling water supplied into the recess 25 toward the upper portion of the inner vertical side wall 13. A drain pipe 29 is connected to the outer annular recess 26 through the bottom thereof and is provided with a water outlet 30 which has a hollow cylindrical nut 31 screwed thereto so as to be movable in the vertical direction for regulating the water level. With such a construction, the cooling water supplied from the pipe 27 into the inner annular recess 25 overflows towards the upper portion of the inner vertical side wall 13 and bears against the outer film layer of the double-layer cylindrical film for cooling and curing the same, and then flows over the upper surface of the deflection plate 28 into the outer annular recess 26. The water, surpassing the upper end of the water level regulator nut 31, is discharged to the exterior through the drain pipe 29. As can be understood from the foregoing description, the regulation of the level of water to bear against the extruded film can be carried out by changing the height of the water level regulator nut 31. Such level is preferably 5 to 20 mm.

In accordance with the present invention, there are provided the inner and outer annular coolant vessels 2 and 3 for cooling the resin extruded in the double-layer cylindrical form. Moreover, the inner vessel is provided with a water level regulator ring 21, and the outer vessel is provided with a water level regulator nut or weir 31 which is hollow and cylindrical. The cooling water is regulated by the ring 21 and nut 31 to be at the same level with respect to the inner and outer film layers. Further, in order to prevent inward distortions of the film layers and bending of the legs between the film layers, the air fed through the air blast holes 11 provided between the annular slits of the die is kept at the same level of pressure as the cooling water bearing against the film layers. Some experimental embodiments of the present invention shall be described in the following:

EMBODIMENT 1

Ethylene vinyl acetate resin of MI (Melt Index)2 containing 15% of vinyl acetate and molten at a temperature of 190° C. was extruded in the double-layer cylindrical form from the outlet 7 of the die 1 as shown in FIG. 2 by means of a 90 mm extruder at a rate of 100 kg/h. The inside wall defining the inner annular slit 8 and the outside wall defining the outer annular slit 9 were spaced from each other by 6.2 mm at the outlet and the leg slits were mutually spaced by 4.0 mm. The resin extruded in the double-cylindrical form was immediately led into the cooling water and guided between the outer side wall 12 of the inner annular coolant vessel 2 and the inner side wall 13 of the outer annular coolant vessel 3. The space between the upper end of the side walls 12 and 13 and the die outlet 7 was about 20 mm. While the air fed through the air blast hole 11 between the annular slits 8 and 9 of the die was set at a water column pressure of about 25 mm, the water level above the upper end of the inner and outer side walls 12 and 13 was varied. When the water level, increased gradually, exceeded a height of 20 mm above the upper end of the side walls 12 and 13, the film layers began to be distorted toward each other, some legs bent, and the cooling water dropped through the space formed between the side walls 12 and 13 and the film layers due to the inward distortion of the film layers. To the contrary, when the water level, decreased gradually, became lower than 5 mm, the film began to flare inwardly due to the air pressure supplied in between the film layers and the cooling efficiency become too low to secure a stable quality of film. When the water level was set at the height of 15 mm in view of the above results, the inner and outer film layers were properly kept in contact with the inner and outer side walls 12 and 13 so as to prevent cooling water from dropping down therethrough. The air pressure was balanced with the hydraulic pressure across the film layer so as to prevent inward or outward distortion of the film layers and bending of the legs. The cooling water seemed as if it were stationed, with the surface thereof being like a mirror. Under such stable cooling conditions, the double-layer cylindrical film was cooled and cured at a rate of 5 m/min. The film having passed through the coolant vessels 2 and 3 was folded by a pair of pinch rollers into a sheet form. One side of the film was cut open by means of a cutter knife into a wide sheet having a width of 2 to 3 m and then taken up by a conventional winder.

The resulting double-layer film had a so called observed thickness of 2.0 mm between the film layers and a unit weight of about 150 g/m². The general light permeability was as high as about 85%. The film was very flexible having no leg bendings therein.

EMBODIMENT 2

High pressure polyethylene of MI 2 of the type used for forming heavy duty bags was extruded from the outlet of the die substantially in the same manner as in Embodiment 1. While the air pressure fed in between the film layers was set at water column pressure of 30 mm, the water level was varied. When the water level was about 18 mm, the hydraulic pressure was balanced with the air pressure. Under the stable cooling conditions thus obtained, polyethylene double-layer film could be produced.

EMBODIMENT 3

Soft vinyl chloride resin molten at temperature of 190° C. was extruded out of the outlet of the die substantially in the same manner as in Embodiment 1. While the air pressure fed in between the film layers was set at the water column pressure of 20 mm, the water level was varied. When the water level was about 10 mm, the hydraulic pressure was balanced with the air pressure. Under the stable cooling conditions thus obtained, vinyl chloride double-layer film could be produced.

Although the present invention has been described above with reference to the preferred embodiments thereof, many modifications and alterations may be made within the scope of the present invention.

What is claimed is:

1. An apparatus for forming a flexible double-layer hollow film, said apparatus comprising:
    an extruding die having an outlet including a pair of inner and outer annular slits arranged concentrically closely adjacent each other and a plurality of annularly spaced leg slits extending between said pair of annular slits, said die being arranged to extrude downwardly through said outlet a molten thermoplastic film including inner and outer concentric annular film layers connected by a plurality of annularly spaced legs with a plurality of annularly spaced chambers being defined between said annular film layers and said legs;
    said extruding die including means for feeding pressurized air downwardly into said chambers;
    an inner cooling vessel positioned beneath said extruding die;
    an outer cooling vessel, separate from said inner cooling vessel, positioned beneath said extruding die and surrounding said inner cooling vessel;
    said inner and outer cooling vessels respectively having outer and inner annular side walls defining therebetween an annular gap through which said molten thermoplastic film passes with said inner and outer annular film layers respectively contacting said outer and inner annular side walls;
    means for supplying separate flows of cooling liquid into said inner and outer cooling vessels and for causing said cooling liquid to fill said cooling vessels and to overflow said outer and inner annular side walls thereof and to directly contact said inner and outer annular film layers, respectively; and
    means for adjusting the levels of said separate flows of cooling liquid overflowing above said outer and inner annular side walls of said inner and outer cooling vessels such that said levels are equal to each and such that the liquid pressure exerted by said cooling liquid on said inner and outer film layers is balanced with the air pressure of said pressurized air within said chambers.

2. An apparatus as claimed in claim 1, wherein the diameters of said inner and outer annular slits in said extruding die are respectively substantially equal to the diameters of said inner and outer annular side walls.

3. An apparatus as claimed in claim 1, further comprising deflection plate means in said inner and outer cooling vessels for directing said separate flows of cooling liquid toward said outer and inner annular side walls, respectively.

4. An apparatus as claimed in claim 1, wherein each said cooling vessel includes a supply recess connected to said supplying means and a discharge recess connected to a cooling liquid discharge, and each said level adjusting means comprises a vertically adjustable water level regulator member for regulating the level of discharge of said cooling liquid from the respective said discharge recess to the respective said cooling liquid discharge.

5. A method of forming a flexible double-layer hollow film, said method comprising:

downwardly extruding a molten thermoplastic film having inner and outer concentric annular film layers connected by a pluarlity of annularly spaced legs, with a plurality of annularly spaced chambers being defined between said annular film layers and said legs;

feeding pressurized gas downwardly into said chambers;

immediately passing the thus extruded thermoplastic film through an annular gap defined between an outer annular side wall of an inner cooling vessel and an inner annular side wall of an outer cooling vessel surrounding said inner cooling vessel while contacting said inner and outer annular film layers against said outer and inner annular side walls, respectively;

supplying separate flows of cooling liquid into said inner and outer cooling vessels such that said cooling liquid fills said cooling vessels and overflows above said outer and inner annular film layers, respectively, thereby cooling said thermoplastic film; and adjusting the levels of said separate flows of cooling liquid overflowing above said outer and inner annular side walls of said inner and outer cooling vessels such that said levels are equal to each other and such that the liquid pressure exerted by said cooling liquid on said inner and outer film layers is balanced with the air pressure of said pressurized air within said chambers.

6. A method as claimed in claim 5, comprising directing said separate flows of cooling liquid toward said outer and inner annular side walls by means of deflection plates in said inner and outer cooling vessels, respectively.

7. A method as claimed in claim 5, wherein each said cooling vessel includes a supply recess connected to a cooling liquid supply and a discharge recess connected to a cooling liquid discharge, and said adjusting comprises vertically moving a water level regulator member and thereby regulating the level of discharge of said cooling liquid from each said discharge recess to the respective said cooling liquid discharge.

8. A method as claimed in claim 5, wherein said adjusting comprises maintaining said levels from 5 to 20 mm above said inner and outer annular side walls.

* * * * *